May 31, 1960
W. KOOISTRA
2,938,773
APPARATUS FOR THE REDUCTION OF SOLUTIONS
BY MEANS OF A LIQUID AMALGAM
Filed March 7, 1955
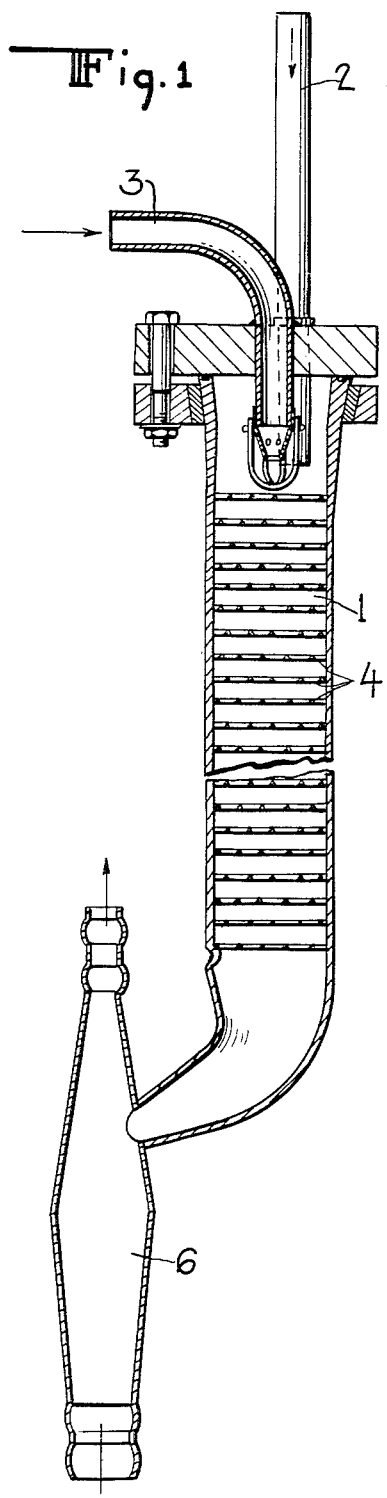
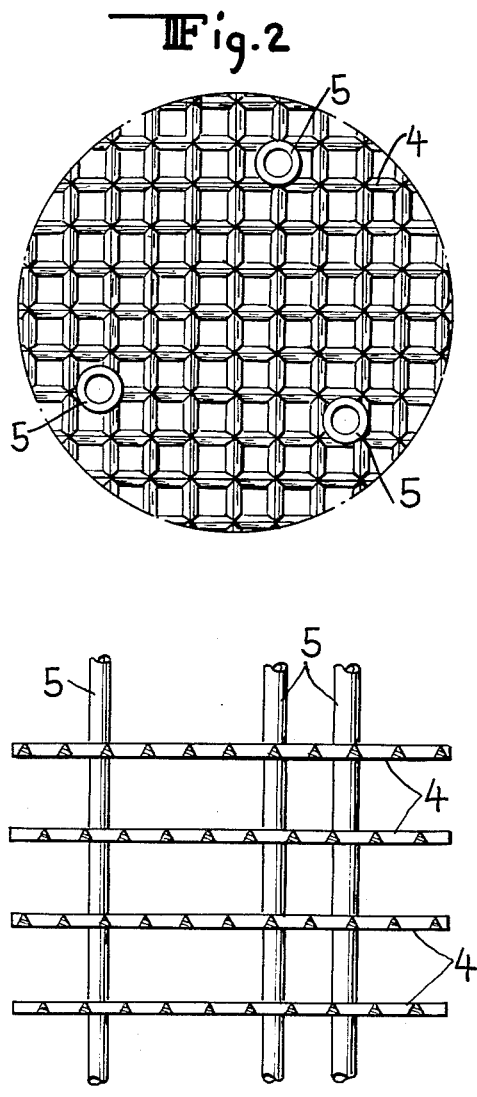
INVENTOR
WILLEM KOOISTRA
BY
ATTORNEYS

United States Patent Office 2,938,773
Patented May 31, 1960

2,938,773
APPARATUS FOR THE REDUCTION OF SOLUTIONS BY MEANS OF A LIQUID AMALGAM

Willem Kooistra, Delft, Netherlands, assignor to N.V. Koninklijke Nederlandsche Zoutindustrie, Boortorenweg, Hengelo, Netherlands, a corporation of the Netherlands Filed Mar. 7, 1955, Ser. No. 492,589

Claims priority, application Netherlands Mar. 6, 1954

2 Claims. (Cl. 23—283)

The invention relates to an apparatus for the reduction of solutions by means of a liquid amalgam selected from the group consisting of alkali and alkali earth amalgam. The apparatus of the invention which comprises a vertical reactor is provided with dividing bodies to divide the amalgam passing through and is filled with the liquid being reduced.

A great many reduction reactions of solutions have been made with amalgams, such as in the preparation of dithionites from solutions containing bisulphites, in the reduction of dissolved polysulphides to give sulphides and in the preparation of chlorites from chlorine dioxide. All these reductions can be effected by means of an amalgam of an alkali metal, particularly sodium amalgam which is generally prepared in electrolytic cells.

In carrying out these reductions, reactors have been proposed which contained dividing bodies in order to enarge the contact surface between the amalgam and the solution to be reduced. It was previously thought that the capacity of the reactor would be increased by enlarging the contact surface, particularly with the use of a catalytic material as the dividing body. Usual dividing bodies, which have been proposed, are, for example, Raschig rings, glass beads, Berl-saddles, pieces of quartz, and the like, which have been poured or piled in the reactor.

When sodium amalgam is decomposed with water to produce caustic soda and hydrogen, which reaction lies outside the scope of the present invention, a catalytic filling, such as graphite, is usually used. For the preparation of highly concentrated alkali lyes by amalgam decomposition, it has been proposed to use a vertical reactor partly filled with a catalyst mass, which mass may consist of a pile of decomposition grids of graphite over and through which the amalgam drips. These grids are placed on top of each other so as to bring the amalgam into contact with these grids as much as possible, thus dividing the amalgam as much as possible.

Further in reactors for the preparation of caustic soda from sodium amalgam and water, it has been proposed to use a filling which consists of one single grid, built up from bars of catalytically active graphite, said bars having a square cross section with one of the points being directed upwards.

I have found that in the desired reactions, the yield of the product is considerably better while detrimental side-reactions are suppressed when a vertical reactor is used if the amalgam is passed through the reactor space in a plurality of streams or substantially coherent jets and in such a way that concentrations of the reacting components (and therewith potential differences between the liquids) at places of contact between the amalgam and the liquid which is to be reduced are maintained substantially as close to value(s) required for optimum occurrences of the main reaction. If the amalgam were only divided at the top of the reactor, the amalgam jets would merge in the reactor a few moments later or would fall apart into drops, so that in a large reactor dividing bodies should not only be introduced at the top, but in various places in the vertical reactor to divide the amalgam falling upon them, causing the separate jets or streams to be recombined with other coherent jets or streams in other places so that over the whole height of the reactor substantially coherent jets or streams are maintained through being constantly divided and recombined, and no places of contact having undesired concentrations of the reacting components are formed.

The importance of this procedure will be evident from the following example:

In the preparation of sodium chlorite from sodium amalgam and aqueous $ClO_2$, the yield is highly dependent on the extent to which side-reactions are avoided.

The desired main reactions are as follows:

$$ClO_2 + e \rightarrow ClO_2^- \qquad (1)$$

$$Na(Hg)_x \rightarrow Na^+ + (Hg_x) + e \qquad (2)$$

The following side-reactions may also occur, depending on the reaction conditions:

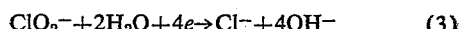
$$ClO_2^- + 2H_2O + 4e \rightarrow Cl^- + 4OH^- \qquad (3)$$

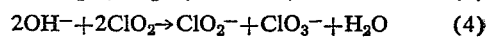
$$2OH^- + 2ClO_2 \rightarrow ClO_2^- + ClO_3^- + H_2O \qquad (4)$$

$$2Hg \rightarrow Hg_2^{++} + 2e \qquad (5)$$

The invention is based on the idea that in the progress of the amalgam through the reactor, places of contact between the amalgam and the $ClO_2$ solution are so maintained that the concentrations of the reacting components (and the potential differences between the liquids) are such that the desired reactions (1) and (2) can take place and the detrimental side-reactions (3), (4), (5) are avoided. The maintenance of these conditions is effected by leading the amalgam in substantially coherent jets or streams through the reactor.

In the apparatus for carrying out the process of the invention it is thus necessary to avoid the occurrence of undesirable concentrations in the places of contact. To this end, according to the invention, a vertical reactor is provided with several superposed dividing bodies which divide the amalgam, which occupy at most 10% of the reactor space and which are arranged in horizontal layers in such a way that the distance between the layers of dividing bodies is at least 3 times the height of the bodies themselves. It has been found that it is nearly impossible to avoid the occurence of places of contact within the reactor where the concentrations of reactants deviate from the desired concentrations when the dividing bodies occupying more than 10% of the reactor space or when they have a mutual distance apart amounting to at least 3 times the height of the dividing bodies. The dividing bodies should preferably consist of electrically insulating non-catalytic material, and they should have a shape such that no amalgam can be left on them. The vertical cross-section of the ribs of the dividing bodies should be circular or, preferably, the cross-section of the ribs should have the shape of a triangle or rhomb with one of the sharp angles pointing upwards. The layers of dividing bodies are preferably superimposed in such a way that the openings of each succesive layer of dividing bodies are shifted horizontally with respect to the preceding layer of dividing bodies. If the vertical distance between these layers of dividing bodies is correct, the amalgam, which has been divided into many separate but unbroken jets or streams is reflected by the vertical walls of the reactor when it comes into contact with them. Therefore the amalgam does not accumulate on the vertical walls of the reactor as is the case with the application of the known reactor fillings.

When the vertical distances between the layers of dividing bodies are too large, the amalgam jets will split into drops, which is undesirable in amalgam reduction reactions, and particularly for those reactions, in which the potential difference between the amalgam and the other liquid should be kept at a certain value or between limits such as is described in my copending U.S. patent application Ser. No. 476,034, filed December 17, 1954. This optimum potential difference cannot or can hardly be maintained if the amalgam is divided into drops. The desired vertical distance between the layers of dividing bodies also depends, in addition, on the surface tension of the amalgam and on the viscosity of the solution to be reduced and can be determined by experiments.

Thus, for example, in the preparation of alkali or alkali earth chlorites from an aqueous solution of chlorine dioxide by means of an alkali or alkali earth amalgam, the layers of dividing bodies are kept one on top of the other at a vertical distance of approx. 1 cm. apart, the openings of each layer of dividing bodies being horizontally shifted with respect to each other along the diagonal. The ribs of the dividing bodies are made of polyvinyl chloride and are approx. 1 mm. thick, their shape in cross section being triangular with the top angle of approx. 60° being directed upwards. When using such spaced layers of dividing bodies in a vertical reactor a yield of 90% was obtained as compared to a yield of 78% obtained with a filling consisting of glass beads which have been poured upon each other, said beads having a diameter of 6 mm.

When this invention was applied in the process of the preparation of sodium dithionite from sodium amalgam and a sodium bisulphite solution in water using the same construction as above, it was possible, while maintaining the same production per unit of time, to use a reactor with ⅛ the volume and obtain a yield of 88%, as compared to a yield of 77% obtained with a filling consisting of glass beads as mentioned above.

The invention is further illustrated in the accompanying drawings by way of example.

Fig. 1 represents a vertical longitudinal section of the reactor of the invention with a vertical reactor Fig. 2 is a top view of a layer of the dividing bodies on an enlarged scale and Fig. 3 is a part of the layers of dividing bodies in a vertical section showing the individual ribs in triangular cross-section.

In Fig. 1 the vertical reactor is indicated by reference numeral 1. The reactor is provided with a feed pipe line 2 for the solution to be reduced, said pipe line passing through the lid, and with feed pipe line 3 for the amalgam. The bottom of the reactor 1 is connected with device 6, in which in a way known per se and not being indicated further, the amalgam and the aqueous liquid are separated. The reactor is provided with the layers of dividing bodies 4, which have been superimposed in such a way that the distance between the layers of bodies is more than 3 times the height of these bodies. As appears from Fig. 3, the openings of two successive elements have been mutually shifted horizontally and diagonally. The ribs of the dividing bodies have a triangular vertical cross-section. An amalgam jet or stream which strikes them is separated into two parts, causing little, if any, separate drops to be formed. The layers of dividing bodies 4 are kept in their correct positions by the bars 5.

I claim:

1. A reactor for the reduction of solutions with liquid amalgam selected from the group consisting of alkali metal and alkali earth metal amalgam comprising a shell having a feed line for the solution to be reduced, a feed line for the amalgam, and an outlet line for the said amalgam and solution, the feed line for the amalgam being at the top of the reactor and having means to divide the amalgam into a plurality of streams, said means consisting of a plurality of layers of dividing bodies substantially equally spaced throughout the reactor for repeatedly dividing the amalgam in its passage through the reactor, said dividing bodies having open spaces constituting a substantial portion of the horizontal surface area of each layer of dividing bodies, said layers of dividing bodies occupying not more than 10% of the reactor space, said layers of dividing bodies being spaced apart in horizontal layers so that the space between each of said layers of dividing bodies is at least three times the thickness of said dividing bodies, said dividing bodies consisting of electrically insulating and non-catalytically active material shaped to provide dividers which present convex upper surfaces over which the amalgam will flow without resting thereon so that all amalgam falling thereon will pass through said dividing bodies.

2. The reactor of claim 1 wherein said layers of dividing bodies are spaced in horizontal layers about one centimeter apart, said dividing bodies are triangular in cross section with the apex of the triangle pointed upwards and are about one millimeter thick and the openings in said layers of dividing bodies are horizontally shifted with respect to each other on a diagonal.

References Cited in the file of this patent

UNITED STATES PATENTS

| 197,474 | Jones | Nov. 27, 1877 |
| 679,575 | Reese | July 30, 1901 |
| 875,231 | Acker | Dec. 31, 1907 |
| 1,292,098 | Seamon | Jan. 21, 1919 |
| 2,106,366 | Tijmstra | Jan. 25, 1938 |
| 2,200,906 | Wood | May 14, 1940 |
| 2,392,236 | Edwards | Jan. 1, 1946 |
| 2,474,007 | Maycock | June 21, 1949 |
| 2,588,469 | Basilewsky | Mar. 11, 1952 |

FOREIGN PATENTS

| 472,053 | Italy | June 5, 1952 |
| 295,991 | Switzerland | Apr. 1, 1954 |